United States Patent [19]

Koppelman et al.

[11] 4,069,107

[45] Jan. 17, 1978

[54] CONTINUOUS THERMAL REACTOR SYSTEM AND METHOD

[75] Inventors: Edward Koppelman, Encino; Robert G. Murray, Palo Alto, both of Calif.

[73] Assignee: Edward Koppelman, Encino, Calif.

[21] Appl. No.: 682,600

[22] Filed: May 3, 1976

[51] Int. Cl.² .............................................. C10B 49/18
[52] U.S. Cl. .......................................... 201/12; 48/63;
48/206; 201/34; 201/36; 201/38; 202/120;
202/121; 208/11 R; 432/14; 432/215
[58] Field of Search ......................... 201/12, 28, 34, 36,
201/38; 202/120, 121; 432/13, 14, 215; 34/168,
174; 23/284; 48/63, 64, 206; 208/8, 11 R

[56] References Cited

U.S. PATENT DOCUMENTS

| | | | |
|---|---|---|---|
| 1,698,345 | 1/1929 | Puening | 201/12 |
| 2,735,805 | 2/1956 | Mora | 201/34 |
| 2,835,051 | 5/1958 | Rydin | 34/174 |
| 3,499,834 | 3/1970 | Goins | 208/11 R |
| 3,855,071 | 12/1974 | Koppelman | 201/34 X |

*Primary Examiner*—Joseph Scovronek
*Assistant Examiner*—Arnold Turk
*Attorney, Agent, or Firm*—Harness, Dickey & Pierce

[57] ABSTRACT

Apparatus and process for continuously pyrolyzing or gasifying a particulated carbonaceous feed material in which preheated heat-containing bodies or pebbles are admixed with the feed material in a stratified manner to form a downwardly moving columnar reaction mass, with a remaining portion of the pebbles substantially devoid of any feed material disposed in a surrounding layer relative to the reaction mass. Gas is continuously passed transversely through the reaction mass and surrounding layer in a manner to sweep the gaseous pyrolysis reaction products out of the reaction chamber, and wherein the layers of pebbles surrounding the reaction mass serve to effect a deposition of carbonaceous residue, preventing encrustation and fouling of the reactor system. The pebbles are separated from the pyrolyzed residue comprising an activated char or a residual ash, and are recirculated and reheated in a manner to remove any residual carbonaceous deposits therefrom, whereafter they are reintroduced into the reaction chamber.

17 Claims, 2 Drawing Figures

U.S. Patent   Jan. 17, 1978   4,069,107
Fig. 1.
Fig. 2.
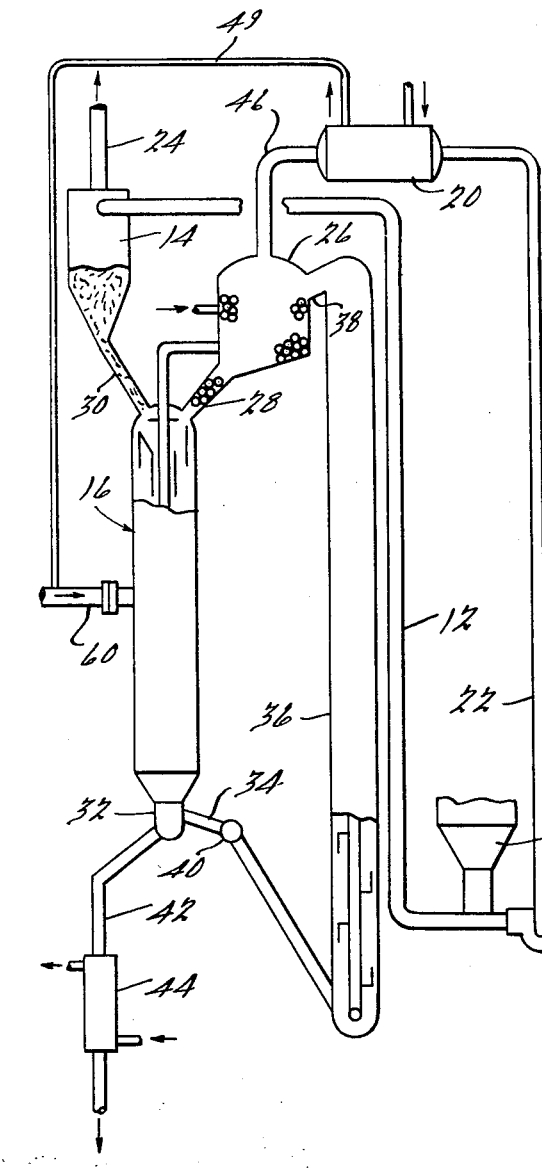
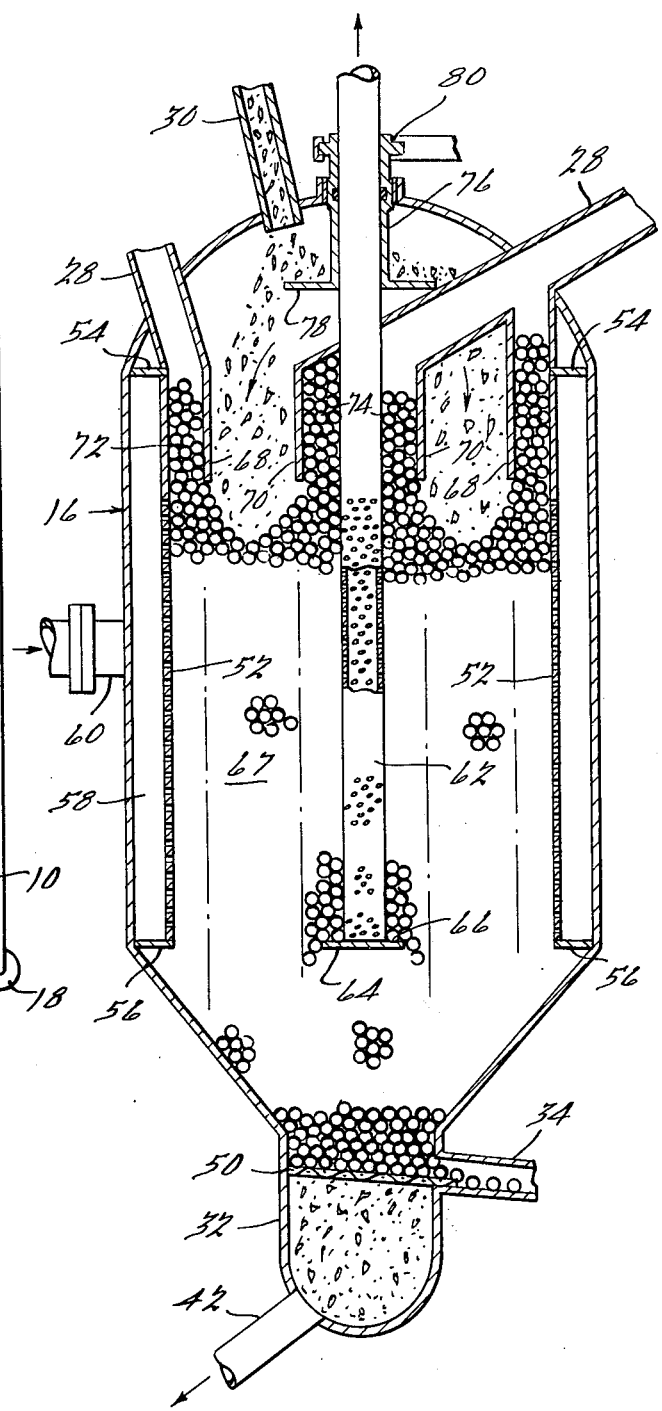

CONTINUOUS THERMAL REACTOR SYSTEM AND METHOD

BACKGROUND OF THE INVENTION

A variety of apparatuses and processes have heretofore been used or proposed for use in the thermal pyrolysis and/or gasification of carbonaceous materials for producing gaseous fuels, activated chars, extraction of valuable hydrocarbon constituents and the like. Conventionally, the carbonaceous material in a particulated form is introduced into a retort or reaction chamber in which it is heated to an elevated temperature while in a controlled atmosphere for a period of time sufficient to effect a thermal degradation or pyrolysis of the feed material accompanied by a liberation of volatile gaseous constituents and gaseous pyrolysis by-products. The carbonaceous feed material can comprise materials of vegetable origin including, for example, tree bark, wood chips, sawdust, rice hulls, nutshells, corn husks, as well as vegetable derivatives, such as peat, lignite, coal, and materials containing such carbonaceous substances, such as oil shale.

A continuing problem associated with processes of the foregoing type has been the tendency of the gaeous pyrolysis products produced to deposit on the surfaces of the carbonized product produced, as well as on the surfaces of the equipment, reducing the efficiency of the pyrolysis reaction and also necessitating frequent shutdowns to remove the carbonaceous deposit from the walls of the retort and associated gas passages. In the manufacture of activated char or carbon employing thermal pyrolysis reactors of the foregoing type, the redeposition of the carbonaceous residues on the surfaces of the char produced substantially reduces the activity of the activated carbon product normally necessitating supplemental activation treatments. The deposition of carbonaceous residues on the equipment surfaces in the form of tars and coke obstructs the uniform flow of the feed material and an efficient removal of the gaseous by-products frequently causing localized hot spots, causing an overcracking or excessive thermal degradation of the gaseous by-products, which still further aggravates the formation and deposition of carbonaceous residues.

The process and apparatus of the present invention overcomes many of the problems associated with prior art apparatuses and techniques by providing a pyrolysis reactor system in which improved control of the uniformity of heating of the carbonaceous material is achieved, and wherein the deposition of carbonaceous residues produced on equipment surfaces and on the carbonized product itself is substantially reduced. In the adaptation of the invention for making activated carbon, the apparatus and process provide for a substantially continuous production of an activated carbon having high adsorptive capacity without requiring further activation treatments as required with prior art techniques.

SUMMARY OF THE INVENTION

The benefits and advantages of the present invention are achieved in accordance with the apparatus aspects thereof by a continuous pyrolysis reactor consisting of a reactor vessel of a generally upright configuration having a reaction chamber to which a feed inlet is connected at the upper portion thereof for introducing a particulated carbonaceous feed material. Preheated solid heat transfer media or pebbles are introduced into the upper portion of the reaction chamber through a distribution system in which a portion of the pebbles are substantially uniformly mixed with the carbonaceous feed material forming a downwardly moving columnar reaction mass and the balance of the pebbles are distributed in the form of a layer surrounding the reaction mass which is substantially devoid of any of the carbonaceous feed material. The reaction chamber is provided with a gas inlet and a gas outlet for introducing a gas, such as steam, carbon dioxide and/or air, into the reaction chamber in a manner to pass transversely through the pebble layers and reaction mass to effect a sweeping of the gaseous pyrolysis decomposition products and volatile constituents formed which are withdrawn through a gas outlet disposed in transverse spaced relationship from the gas inlet. The layer of the pebbles adjacent to the gas inlet effects a preheating of the introduced gas, or a superheating of the steam introduced, as the case may be, to a desired temperature level, while the layer of pebbles adjacent to the gas outlet serves to further thermally decompose and gasify the volatilized gaseous constituents and serves as a depository for the carbonaceous substances produced, effecting an extraction thereof from the gaseous effluent before coming in contact with the structure and associated conduits defining the gas outlet.

The lower portion of the reaction chamber is provided with a separator for separating the pebbles and the carbonaceous char product or solid ash residue which, after further cooling, is discharged from the reactor. The separated pebbles are recirculated to a heater in which the pebbles are reheated in a manner so as to effect combustion and removal of the carbonaceous deposits thereon, whereafter they are returned to the upper portion of the reactor for reuse. In the operation of the reactor to produce an activated char, the immediate removal of the gaseous pyrolysis products formed prevents a redeposition thereof on the active sites of the carbonized product produced such that the carbonized product is characterized as being possessed of high adsorptive capacity, necessitating no further activation treatment.

In accordance with the process aspects of the present invention, a pyrolysis and/or gasification of particulated carbonaceous feed materials at an elevated temperature is effected by mixing the feed material with a preheated particulated heat transfer media in a stratified manner to form a reaction mass enclosed within a layer of heat transfer media, substantially devoid of any feed material, and through which a gas is passed transversely in a manner to sweep the volatiles and gaseous pyrolysis reaction components from the reaction mass employing the downstream layer of heat transfer media as a depository for tarry and carbonaceous residues produced which subsequently are removed during the recirculation and reheating of the heat transfer media. In the specific adaptation of the process to production of activated carbon products, the purging gas is continuously passed through the reaction bed transversely thereof to prevent any significant redeposition of the gaseous pyrolysis products formed on the active sites of the carbonaceous product, which is characterized as having a high adsorptive capacity without requiring any supplemental activation treatments.

Additional benefits and advantages of the present invention will become apparent upon a reading of the description of the preferred embodiments taken in conjunction with the accompanying drawing.

BRIEF DESCRIPTION OF THE DRAWING

FIG. 1 is a schematic layout of a continuous pyrolysis reaction system arranged in accordance with a preferred embodiment of the present invention; and FIG. 2 is a magnified vertical transverse sectional view of the reactor section of the arrangement shown in FIG. 1.

DESCRIPTION OF THE PREFERRED EMBODIMENTS

The schematic arrangement of the apparatus as shown in FIG. 1 is particularly adapted but not necesarily limited to the continuous pyrolysis of vegetable matter, such as wood chips, for example, for producing an activated carbon or char product of a type suitable for use as an adsorbent and upon further comminution, as a filler in a variety of elastomeric and resinous compositions. As shown in FIG. 1, a carbonaceous feed material, such as wood chips, containing entrapped moisture is loaded into a hopper 10 and transferred through an air lift conduit 12 to a storage hopper 14 disposed at an elevated position above the upper end of a reaction vessel 16. A high capacity blower 18 is connected to the inlet of the air lift conduit for effecting an entrainment and lifting of the particulated feed material through the air lift conduit, which in accordance with the specific arrangement illustrated also effects a drying of the feed material during the course of its conveyance and storage. The inlet to the blower 18 is connected to the outlet of a waste heat steam generator 20 by means of a conduit 22, wherein the sensible heat remaining in the hot effluent gases of the process are utilized to effect a drying of the feed material. The storage hopper 14 is constructed in the form of a cyclone-type separator, whereby the particulate matter is retained and the conveying gas is harmlessly discharged to the atmosphere through a stack 24.

A pebble heater or furnace 26 is located at an elevated position relative to the upper end of the reaction vessel 16 in which solid heat transfer media or pebbles are preheated to an elevated temperature and are simultaneously cleansed of any carbonaceous residues or coke deposits thereon prior to being reintroduced into the upper end of the reactor vessel. The heat transfer media or pebbles may comprise any substance which is possessed of a high heat capacity, which is resistant to attrition, which is capable of withstanding the elevated temperatures to which they are subjected and which are of relatively low cost. While various temperature-resistant metals and metal alloys, including cast iron, can be employed for this purpose, refractory ceramic compositions are usually preferred and of which alumina constitutes a particularly satisfactory substance. The configuration of the heat transfer bodies or pebbles preferably is of a generally spheroidal shape and of substantially uniform size in order to provide a reaction mass of substantially uniform porosity and which will move downwardly through the reaction chamber under the influence of gravity. The size of the pebbles may range from a diameter of about ¼ inch up to about ¾ inch, while the sizes of from about ⅜ inch to about ½ inch diameter are usually preferred. The particular size of the pebbles employed is selected in consideration of the type and particle size of the carbonaceous containing feed material processed, and wherein the pebbles are of a size greater than the feed material particle size.

The preheated pebbles, as schematically shown in FIG. 1, are introduced into the upper end of a reaction vessel 16 by means of a conduit 28 and are admixed with the particulated carbonaceous feed material introduced through a conduit 30 connected to the lower portion of the storage hopper 14 in a manner subsequently to be described in detail. The stratified mixture of feed material and pebbles passes downwardly through the substantially upright elongated reaction chamber, during which the desired pyrolysis reaction occurs, whereafter the pebbles are separated from the pyrolyzed carbonaceous product by a screen or trommel separator 32, and the separated pebbles are withdrawn through a discharge conduit 34 and fed into the bottom of a bucket elevator 36 by which they are lifted and again returned to the pebble heater 26 through a pebble inlet conduit 38. The rate at which the reaction mass passes downwardly through the reaction chamber is controlled by a flow control device 40 in the discharge conduit 34. The flow control device 40 may comprise a paddle-type feeder mechanism or similar device for controlling the rate of withdrawal of the pebbles from the separator, whereby the desired residence time of the feed material in the reaction chamber is achieved. The separated pyrolyzed product is withdrawn from the base of the reaction vessel through the separator 32 by an outlet conduit 42, which is provided with a heat exchanger 44 through which air is circulated to effect a cooling of the pyrolyzed product to a temperature below about 400° F in order that it can harmlessly be discharged to product storage in contact with the atmosphere. The cooling air employed in the heat exchanger 44 and the sensible heat recovered thereby can advantageously be employed to form a combustion mixture by introduction into the pebble heater 26 in a manner to burn the carbonaceous residue from the surfaces of the pebbles, as well as to effect a combustion of the gaseous effluent discharged from the reactor to the pebble furnace through a conduit 46.

As shown in FIG. 1, the recycled pebbles entering the pebble furnace via the bucket elevator are substantially cooler than the pebbles entering the upper end of the reactor due to the loss of heat by direct heat exchange contact with the carbonaceous feed material, the exchange of heat with a gas sweep passed through the reaction mass during the pyrolysis reaction, as well as a heating of the volatilized gaseous pyrolysis product produced in addition to the loss of heat during their recirculation back to the pebble furnace. Accordingly, a reheating of the recirculated pebbles is effected in the pebble furnace, preferably by the introduction of a lean gaseous fuel-air mixture, which not only effects a heating of the pebbles, but also effects a generation of supplemental heat by the combustion of the carbonaceous residue or coke deposited on the surfaces of the pebbles. The combustion process is performed so as to reheat the pebbles at a temperature normally ranging from about 800° up to about 1700° F, which will vary depending upon the specific pyrolysis or gasification process being performed in the reactor. Normally, the pebbles are preheated to a temperature ranging from about 1000° up to about 1400° F in the process for producing activated char or carbon from carbonaceous vegetable material, such as woods chips or the like. On the other hand, when the reactor system is employed for the gasification of the carbonaceous feed material into a gaseous fuel of high heating value, leaving only a residual ash, pebble preheat temperatures of from about 1400° to about 1700° F are preferred.

The hot combustion gases from the pebble furnace 26 pass out through a stack 46 into the inlet side of the waste heat steam generator 20, as previously described, and are subsequently employed for drying and conveying the carbonaceous feed material to the storage hopper. The steam produced in the steam generator 20 also can advantageously be used as all or a portion of the gas introduced into the reactor for sweeping the volatiles and other gaseous pyrolysis products from the reaction mass. In such event, the outlet of the steam generator 20 is connected by a conduit 49 for transferring the saturated or superheated steam to a gas inlet conduit 60 disposed in communication with the interior of the reactor.

Referring now in detail to FIG. 2, the reaction vessl 16 is of a generally upright elongated configuration and in the specific embodiment shown, is of a substantially circular transverse configuration. The upper portion of the reaction vessel is of a generally domed configuration, while the lower portion is conical, terminating in the separator 32 having a screen 50 for separating the pebbles from the pyrolyzed carbonaceous product or the residual ash in the case of a gasification operation. An annular wall 52 is mounted within the reaction vessel in spaced concentric relationship with respect to the inner surface thereof, and is closed at its upper end by an annular flange 54 and at its lower end by an annular flange 56. The lower portion of the annular wall 52 is perforated. The annular wall 52 in combination with the annular flanges 54 and 56 define an annular gas chamber or chest 58, which is disposed in communication with the gas inlet conduit 60, by which a gas, such as steam, carbon dioxide, air, oxygen, as well as mixtures thereof, are introduced into the interior reaction chamber through the perforated wall section thereof.

A gas outlet conduit 62 extends downwardly and centrally of the interior of the reaction vessel and is perforated along the lower portion thereof along a region corresponding substantially to the perforated region of the annular wall 52. The upper end of the gas outlet conduit terminates and is connected to the gas outlet conduit 46 through which the gaseous effluent is transferred to the pebble furnace. The lower end portion of the gas outlet conduit is closed by means of a disk-shaped member 64 which is of a diameter greater than that of the conduit, providing an annular flange 66 projecting beyond the periphery of the conduit for the purposes subsequently to be described. The inner surface of the annular wall 52 and the exterior surface of the gas outlet conduit 62 define in combination an annular reaction chamber indicated at 67 in FIG. 2, through which the preheated pebbles and the carbonaceous mixture pass downwardly by the action of gravity toward the separator 32.

In the specific arrangement as shown in FIG. 2, the perforated section of the annular wall 52 and the gas outlet conduit 62 extends vertically along a region of the reaction chamber 67 in which the pyrolysis or gasification reaction occurs. Accordingly, the transverse passage of gas continuously or on an intermittent basis from the chest 58 through the reaction bed into the gas outlet conduit 62 effects a continuous sweeping or purging of the volatile constituents and pyrolysis products formed from the reaction bed. It is also contemplated, in accordance with an alternate embodiment of the present invention, that only the lower portion of the annular wall 52 and gas outlet conduit 62 is formed with a foraminous or perforated structure at a position below the normal pyrolysis zone, such that in the case of the operation of the reactor system for producing an activated char product, the carbonaceous char produced is contacted at substantially the conclusion of the pyrolysis reaction with a gas such as steam to effect an activation thereof in the lower region of the reactor by removing any deposited constituents from the active sites thereof.

The pebble inlet conduit 28, shown as two separate conduits in FIG. 2, extends inwardly of the doomed upper portion of the reaction vessel and is disposed in communication with the upper ends of an outer circular baffle or shroud 68 and an inner baffle or shroud 70, which are disposed concentrically to each other and to the annular wall and periphery of the gas outlet conduit. The outer circular shroud 68 in combination with the annular wall 52 define an outer annular distribution chamber 72, while the inner circular shroud 70 in combination with the periphery of the gas outlet conduit 62 define an inner annular distribution chamber 74 for feeding the heated pebbles into the upper end of the annular reaction chamber in the form of two concentric annular layers. The lower ends of the inner and outer circular shrouds terminate at a point spaced above the perforated sections of the annular wall and gas outlet conduit, enabling the pebbles to tumbler downwardly in a converging fashion for admixture with the particulated carbonaceus feed material introduced into the upper end of the reaction vessel through the inlet conduit 30.

In order to facilitate a uniform distribution of the feed material over the annular area between the inner and outer circular shrouds, a rotatable disk feeder mechanism is provided at the upper end of the reaction vessel, comprising a cylindrical collar 76 mounted for rotation about the upper end of the gas outlet conduit and terminating at its lower portion with a circular annular flange 78 extending in a substantially horizontal direction, which is interposed to intercept the particulated feed material introduced through the conduit 30. The cylindrical coller 76 is supported on a suitable bearing which incorporates a gas seal to prevent the introduction of air into the interior of the chamber and is rotated by a sprocket and drive chain assembly 80 drivingly connected to a variable speed motor (not shown). In accordance with the arrangement as illustrated in FIG. 2, the feed material cascades downwardly through centrifugal and gravitational action in the form of a substantially uniform curtainous stream around the entire annular area between the inner and outer circular shrouds and becomes uniformly admixed with the pebbles as they tumble in converging relationship upon passing beyond the lower edges of the shrouds.

As will be apparent in accordance with the arrangement shown in FIG. 2, the pebble heat transfer media is in the form of stratified layers comprising an outer layer or stratum disposed adjacent to the annular wall, and an inner stratum or layer disposed around the periphery of the gas outlet conduits which are substantially devoid of any carbonaceous feed material. Disposed between the outer and inner annular stratum of pebbles is an annular-shaped reaction mass or stratum comprising the uniform mixture of carbonaceous material and pebbles, which moves downwardly in the form of an annular columnar mass. During the downward movement of the reaction mass, gas is continuously introduced into the annular gas chamber 58 for passage in a substantially transverse and radial inward direction through the outer annular layer, the annular reaction mass and the inner annular layer to effect a sweeping of the volatile constituents and gaseous pyrolysis decomposition products through the porous reaction bed and out through the gas outlet conduit. The annular layer of pebbles disposed adjacent to the perforations of the annular wall 52 serves to heat the entering gas to a temperature approaching that of the reaction mass. When the gas comprises steam, the saturated steam is superheated, while any superheated steam employed becomes further superheated upon passage through the outer annular layer of pebbles and in heat transfer relationship therewith. The downstream inner annular layer serves as a depository for the tarry carbonaceous reaction products, coke and carbon deposits, preventing any appreciable deposition of such residues on the surfaces of the gas outlet conduit and associted equipment. The inner annular layer of pebbles also effects a further thermal decomposition and/or cracking of the volatilized constituents during the pyrolysis or gasification process.

The integrity of the inner annular layer of pebbles surrounding the gas outlet conduit is promoted by the annular flange 66 which restricts downward movement of the inner portion of the pebbles, assuring continuity of the layer over the length of the perforated section of the outlet conduit. The carbonaceous residue deposited on the pebbles is subsequently removed in the pebble furnace in a manner as previously described.

While it will be apparent that the invention herein described is well calculated to achieve the benefits and advantages hereinabove set forth, it will be appreciated that the invention is susceptible to modification, variation and change without departing from the spirit thereof.

What is claimed is:

1. A continuous thermal reactor comprising a reactor vessel defining an elongated upright reaction chamber having a feed inlet in the upper portion thereof for introducing a particulated carbonaceous feed material and a residue outlet in the lower portion thereof for withdrawing the pyrolyzed residue, supply means for supplying the feed material to said feed inlet, a pebble heater having a pebble inlet and a pebble outlet, a first conduit connected to said pebble outlet for transferring heated pebbles into the upper portion of said reaction chamber, distributor means in the upper portion of said reaction chamber for mixing a portion of the pebbles with the feed material in the form of a downwardly moving columnar reaction mass and for distributing the remaining portion of the pebbles substantially devoid of any feed material in the form of a downwardly moving upstream layer and a downwardly moving downstream layer overlying and surrounding said reaction mass, a gas inlet for introducing a gas into said reaction chamber along a region intermediate of said feed inlet and said residue outlet for passage substantially transversely through said upstream layer, said reaction mass and said downstream layer; a gas outlet for withdrawing the gas and gaseous pyrolysis products from said reaction chamber along a region disposed adjacent to said downstream layer and transversely spaced from said gas inlet, a separator in the lower portion of said chamber for separating the pyrolyzed residue from said pellets, and a second conduit connected to said pebble inlet for withdrawing and recirculating the separated pebbles to said pebble heater.

2. The reactor as defined in claim 1, further including a cooling device connected to said residue outlet for cooling the pyrolyzed residue discharged from said reactor.

3. The reactor as defined in claim 1, further including a third conduit connected to said gas outlet for transferring at least a portion of the gaseous effluent to said pebble heater for combustion and reheating of the pebbles therein.

4. The reactor as defined in claim 1, further including means for introducing air into said pebble heater in an amount to promote combustion of any carbonaceous residue remaining on the surfaces of the recirculated pebbles.

5. The reactor as defined in claim 1, in which said gas inlet comprises a perforate wall disposed in spaced relationship inwardly of the inner surface of said vessel forming an annular gas distributing chamber.

6. The reactor as defined in claim 1, in which said feed further includes a rotating distribution member for receiving and distributing the particulated feed material uniformly across an annular area for admixture with the heated pebbles.

7. The apparatus as defined in claim 1, wherein said reaction chamber is of a generally circular transverse cross section and includes a perforate conduit extending downwardly from the upper portion thereof substantially centrally of said reaction chamber, said distributor means comprises a first circular shroud disposed concentrically about the upper portion of said perforate conduit and a second circular shroud disposed concentrically about said first circular shroud and spaced inwardly of the interior wall of said vessel defining an inner annular chamber between said first circular shroud and said perforate conduit, an outer annular chamber between said second circular shroud and the interior wall of said vessel, and an annular chamber therebetween, means connecting the outlet of said first conduit to said inner annular chamber and said outer annular chamber for introducing the heated pebbles into the reaction chamber in the form of concentric annular columns, said feed inlet oriented to introduce said feed material into said reaction chamber in the annular area disposed between said first and said second shrouds for admixture with the pebbles passing downwardly beyond the lower edges of said shrouds in a manner to form an annular shaped mixture defining said columnar reaction mass disposed between a concentric said upstream layer and a concentric said downstream layer of heated pebbles substantially devoid of any feed material.

8. The reactor as defined in claim 1, wherein said reaction chamber is of a generally circular transverse cross section and said reactor vessel is formed with a perforate wall extending around the interior thereof in spaced relationship from the inner surface of said vessel and formed with a perforate conduit extends centrally of said chamber and said perforate wall defining in combination said gas inlet and said gas outlet between which the gas and gaseous pyrolysis products pass in a substantially radial direction.

9. The reactor as defined in claim 8, in which said perforate conduit terminates at a point space upwardly of said separator means and includes a member affixed to the lower portion thereof retarding the downward movement of the layer of pebbles disposed adjacent to said porous conduit.

10. A process for pyrolysis of a carbonaceous feed material which comprises the steps of introducing a particulated carbonaceous feed material into the upper portion of an elongated upright reaction chamber, introducing heated pebbles at a controlled temperature into the upper portion of said reaction chamber, mixing a portion of the pebbles in heat transfer contacting relationship with said feed material to form a downwardly moving columnar reaction mass, distributing the remaining portion of the heated pebbles in the form of a downwardly moving upstream layer and a downwardly moving downstream layer substantially devoid of any feed material overlying an surrounding said reaction mass, introducing a gas into said reaction chamber for passage substantially transversely through said upstream layer, said reaction mass and said downstream layer; withdrawing the gas and gaseous pyrolysis products from said chamber along a region adjacent to said downstream layer and transversely spaced from the region at which the gas is introduced, controlling the downward movement of the reaction mass to effect a desired pyrolysis of said feed material, separating the pyrolyzed residue from the pebbles in the lower portion of said reaction chamber, and extracting the pyrolyzed residue from said reaction chamber.

11. The process as defined in claim 10, in which the heated pebbles are introduced into the reaction chamber at a controlled temperature ranging from about 800° to about 1700° F.

12. The process as defined in claim 10, including the further step of recovering and recirculating the separated pebbles.

13. The process as defined in claim 12, including the further step of reheating the recirculated pebbles in a manner to remove any residual carbonaceous deposits thereon.

14. The process as defined in claim 10, in which the step of controlling the downward movement of the reaction mass to effect a desired pyrolysis of said feed material is performed at a temperature and for a period of time sufficient to produce an activated pyrolyzed char product.

15. The process as defined in claim 14, in which the heated pebbles are introduced into the reaction chamber at a controlled temperature ranging from about 1000° to about 1400° F.

16. The process as defined in claim 10, in which the step of controlling the downward movement of the reaction mass to effect a desired pyrolysis of said feed material is performed at a temperature and for a period of time sufficient to effect a substantially complete thermal degradation and gasification of said feed material to produce a pyrolyzed residue comprising ash.

17. The process as defined in claim 16, in which the heated pebbles are introduced into the reaction chamber at a controlled temperature ranging from about 1400° to about 1700° F.

* * * * *

UNITED STATES PATENT AND TRADEMARK OFFICE
CERTIFICATE OF CORRECTION

PATENT NO. : 4,069,107
DATED : January 17, 1978
INVENTOR(S) : Edward Koppelman, Robert G. Murray It is certified that error appears in the above-identified patent and that said Letters Patent are hereby corrected as shown below:

Column 4, line 60, insert --F-- after 800°; column 4 line 63, after "1000°" insert --F--; column 5, line 2, after "1400°" insert --F--; column 6, line 12, "doomed" should be --domed--; column 6, line 15 after "inner" insert --circular--; column 6, line 28, "tumbler" should be --tumble--; column 7, line 19, "associted" should be --associated--; Claim 6, line 20 after "feed" insert --inlet--; Claim 8, line 58, "extends" should be --extending--; Claim 10, line 13, after "overlying  an" should be --and--; Claim 11, line 28 after "800°" insert --F--; Claim 15, line 17, after "1000°" insert --F--; Claim 17, line 28, after "1400°" insert --F--.

Signed and Sealed this

Second Day of May 1978

[SEAL]

Attest:

RUTH C. MASON
Attesting Officer

LUTRELLE F. PARKER
Acting Commissioner of Patents and Trademarks